United States Patent
Omont et al.

(10) Patent No.: US 11,523,609 B2
(45) Date of Patent: Dec. 13, 2022

(54) SEED TREATMENT USING HYDROSWELLABLE POLYMER

(71) Applicant: S.P.C.M. SA, Andrezieux-Boutheon (FR)

(72) Inventors: Alexandre Omont, Andrezieux (FR); Charles Lecointe, Andrezieux (FR)

(73) Assignee: S.P.C.M. SA, Andrezieux-Boutheon (FR)

( * ) Notice: Subject to any disclaimer, the term of this patent is extended or adjusted under 35 U.S.C. 154(b) by 137 days.

(21) Appl. No.: 16/060,752

(22) PCT Filed: Dec. 8, 2016

(86) PCT No.: PCT/EP2016/080296
§ 371 (c)(1),
(2) Date: Jun. 8, 2018

(87) PCT Pub. No.: WO2017/097920
PCT Pub. Date: Jun. 15, 2017

(65) Prior Publication Data
US 2019/0000075 A1    Jan. 3, 2019

(30) Foreign Application Priority Data
Dec. 9, 2015    (FR) ........................ 1562058

(51) Int. Cl.
| A01C 1/06 | (2006.01) |
| A01N 25/04 | (2006.01) |
| C09D 5/02 | (2006.01) |
| A01N 25/00 | (2006.01) |
| A01N 25/12 | (2006.01) |
| A01N 25/10 | (2006.01) |
| C09D 133/02 | (2006.01) |
| C09D 133/26 | (2006.01) |

(52) U.S. Cl.
CPC ........... A01N 25/04 (2013.01); A01C 1/06 (2013.01); A01N 25/00 (2013.01); A01N 25/10 (2013.01); A01N 25/12 (2013.01); C09D 5/024 (2013.01); C09D 133/02 (2013.01); C09D 133/26 (2013.01)

(58) Field of Classification Search
None
See application file for complete search history.

(56) References Cited

U.S. PATENT DOCUMENTS

| 2,579,735 | A | * | 12/1951 | Burgesser | A01C 1/06 47/57.6 |
| 4,249,343 | A | | 2/1981 | Dannelly | |
| 4,587,308 | A | * | 5/1986 | Makita | A61L 15/60 524/430 |
| 5,795,439 | A | * | 8/1998 | Euripides | D21H 21/22 162/100 |
| 6,239,230 | B1 | * | 5/2001 | Eckert | A61L 15/42 525/329.9 |
| 7,423,090 | B2 | | 9/2008 | Doane et al. | |
| 8,318,306 | B2 | | 11/2012 | Tian et al. | |
| 8,794,948 | B2 | | 5/2014 | Tian et al. | |
| 2004/0265387 | A1 | * | 12/2004 | Hermeling | C08L 51/08 424/486 |
| 2005/0159315 | A1 | | 7/2005 | Doane et al. | |
| 2006/0173097 | A1 | * | 8/2006 | Ahmed | A61L 15/60 524/436 |
| 2006/0240983 | A1 | | 10/2006 | Yamaguchi | |
| 2007/0015878 | A1 | * | 1/2007 | Savich | C05G 5/40 525/242 |
| 2008/0236037 | A1 | * | 10/2008 | Rose | C09D 197/00 47/57.6 |
| 2009/0191408 | A1 | | 7/2009 | Tian et al. | |
| 2012/0122688 | A1 | | 5/2012 | Wu et al. | |
| 2013/0096000 | A1 | | 4/2013 | Tian et al. | |
| 2014/0134270 | A1 | | 5/2014 | Wu et al. | |

FOREIGN PATENT DOCUMENTS

| CN | 1829435 | 9/2006 |
| CN | 1906243 | 1/2007 |
| CN | 101932343 | 12/2010 |
| CN | 103260401 | 8/2013 |

OTHER PUBLICATIONS

International Search Report for PCT/EP2016/080296, dated Feb. 16, 2017.
Written Opinion of the International Search Authority for PCT/EP2016/080296, dated Feb. 16, 2017.
Snf: "Water retainers for Soils and Substrates", 9 Jan. 31, 2014 (Jan. 31, 2014), XP055295242, Retrieved from the Internet: URL:http://snf.us/wp-content/uploads/2014/08/Agriculture-AQUASORB2.pdf [retrieved on Aug. 12, 2016], the whole document.
Preliminary Search Report for FR 1562058, dated Aug. 22, 2016.

* cited by examiner

*Primary Examiner* — Mandy C Louie
(74) *Attorney, Agent, or Firm* — B. Aaron Schulman, Esq.; Stites & Harbison, PLLC

(57) ABSTRACT

The invention relates to the field concerning the treatment of plant material, particularly plant material for propagation or reproduction e.g. seeds. The method of the invention comprises the application, to all or part of the surface of plant material, of an aqueous dispersion comprising (a) particles of at least one water-swellable polymer and (b) at least one compound selected from among a mineral salt, organic salt, dispersant organic polymer and mixtures thereof.
The invention also relates to this treated plant material and to use thereof for cultivating or producing a plant.

12 Claims, No Drawings

SEED TREATMENT USING HYDROSWELLABLE POLYMER

The invention relates to the field concerning the treatment of plant material, particularly plant material for propagation or reproduction e.g. seeds. The method of the invention comprises the application, to all or part of the surface of plant material, of an aqueous dispersion comprising (a) particles of at least one water-swellable polymer and (b) at least one compound selected from among a mineral salt, organic salt, dispersant organic polymer and mixtures thereof.

The invention also relates to this treated plant material and to use thereof for cultivating or producing a plant.

In general, an improvement in cultivating conditions has become increasingly necessary. Methods for treating plant material, particularly plant material for propagation or reproduction, are a major line of technical development.

For example, the coating of plant material with a water-swellable polymer is a practice of interest in the agricultural sector. Water-swellable polymers of natural or synthetic origin are able to absorb water up to several hundred times their weight. They are therefore excellent water-retainers. The main advantage of coating plant material with water-swellable polymer is to optimise use of water and associated active substances.

The coating of plant material with a water-swellable polymer is of advantage for example for the cultivation of food, industrial or ornamental cultures. The entirety of the plant material can be coated as is often the case for seeds. At times it may only be partly coated, as is the case for daubing plant roots or for coating sugar-cane cuttings.

Partial or full coating of plant material with a water-swellable polymer can be obtained by applying the polymer in finely ground powder form. On this account, for good attaching of the polymer, the surface of the plant material to be coated can be previously coated with a binding agent before applying the polymer.

According to other methods, the water-swellable polymer in powder form can be previously mixed with a binding agent e.g. graphite, before being applied to the surface of the plant material to be coated.

An individualizing substance can also be used to prevent agglomeration of plant materials e.g. seeds, during or after coating treatment thereof. However, with these methods, the amount of water-swellable polymer applied to the surface to be treated remains low, generally less than 2% by weight. And more especially, these methods imply the handling and emission of very fine polymer dust that is a hazard for operators.

Another alternative is to conduct coating of the plant material by applying the water-swellable polymer in gel form. For this purpose, the polymer is fully or partly hydrated or water-swollen before application. The use of a binding agent is often required. Again, the amount of polymer applied to the surface to be treated remains small. In addition, a drying step is needed on the end product if it is desired to limit difficulties of storage, transport and use of non-dried coated plant material. Finally, said method is difficult to apply on an industrial scale.

Another method for applying the water-swellable polymer to plant material is application in the form of an inverse water-in-oil suspension. The major disadvantage of this method is the handling of large quantities of hydrocarbons ranging from 1 to 10 times the quantity of polymer. In addition, apart from the difficulties of drying the coated material further to the use of hydrocarbons, the latter generate eco-toxicological problems. Finally, with regard to seeds, coating with water-swellable polymer using said method leads to problems of flowability and passage through seeders, and to deterioration of the agronomic qualities of the plant material.

With most methods used to apply full or partial coating to plant material, the end product in dried form—particularly plant material coated with water-swellable polymer—exhibits low resistance to abrasion due to attrition phenomena. Therefore, the durability of the coating remains low and the emission of fine polymer particles may also be a hindrance at the time of use the coated plant material.

The methods in the state of the art are therefore often complex and scarcely efficient. In particular, they exhibit problems of homogeneity and quantity of applied polymer. They also lead to products that are sensitive to attrition or abrasion, or to products having insufficient flowability.

It is therefore necessary to have methods available that allow solutions to be brought to all or part of the problems with prior art methods.

Consequently, there is a need for methods to treat plant material with water-swellable polymers that adhere strongly to the plant material or are in the form of particles of micrometric size.

The invention therefore provides a method for treating plant material comprising the application, to all or part of the surface of the plant material, of an aqueous dispersion comprising:
(a) particles of at least one water-swellable polymer;
(b) at least one compound selected from among a mineral salt, organic salt, dispersant organic polymer and mixtures thereof.

Preferably, the dispersion used in the invention comprises:
(a) particles of at least one water-swellable polymer; and
(b) a mixture of at least one dispersant organic polymer and at least one mineral or organic salt.

For the method of the invention, the plant material is preferably a plant material for propagation or a plant material for reproduction, particularly plant material selected from among seeds, cuttings, seedlings, shoots, roots, rootlets, bulbs, rhizomes, tubers, branches, stems, calluses, buds, fruit and parts or partial elements of these plant materials as well as corresponding genetically modified organisms. Seeds are the particularly preferred plant material.

For the method of the invention, the plant material can be selected from among cereal crop plants, pseudo-cereal crop plants, industrial crop plants, oil-producing plants, protein-producing plants, sacchariferous plants, condiment plants, horticultural plants, ornamental plants, fodder plants, kitchen garden plants, leguminous plants, fruit trees, citrus fruit, vines, plants cultivated to produce starches, plants cultivated for the production of spices, plants cultivated for the production of agrofuels, plants cultivated for the production of at least one product selected from among cotton, flax, paper, textiles, wood, rubber, household products, adhesives, cosmetic products, perfumes, pharmaceutical products, phytopharmaceutical products.

The polymer (a) is also known to be a super-absorbent polymer. In general, it has a water-absorption capacity higher than 10 times its volume. In particularly advantageous manner for the method of the invention, the water-swellable polymer when in the dispersion is not or only scarcely water-swollen. Scarcely water-swollen means that it maintains a water absorption capacity greater than 10 times its volume.

When the polymer is applied to seeds, it is not hydrated (water-swollen) on account of the presence of salts or equilibrating agents.

The water-swellable polymer of the invention can be prepared from different water-soluble monomers, in particular from at least one water-soluble monomer comprising at least one double ethylenic bond. It can therefore be prepared from at least one anionic monomer, from at least one non-ionic monomer, from at least one cationic monomer or from at least one zwitterionic monomer, alone or in a mixture. In general, the water-swellable polymers of the invention are obtained by cross-linking and therefore form three-dimensional networks.

As examples of anionic monomers, advantageous use is made of at least one monomer selected from among:
- monomers comprising at least one carboxylic function e.g. acrylic acid, methacrylic acid and salts thereof;
- monomers comprising at least one sulfonic acid function e.g. 2-acrylamido-2-methylpropane sulfonic acid (AMPS) and salts thereof.

The preferred anionic monomers are acrylic acid, and 2-acrylamido-2-methylproprane sulfonic acid, and salts thereof.

As examples of non-ionic monomers, advantageous use is made of at least one monomer selected from among:
- acrylamide and derivatives thereof, particularly N-alkylacrylamides e.g. N-isopropylacrylamide, N-tert-butylacrylamide; N,N-dialkylacrylamides e.g. N,N-dimethylacrylamide and N-methylolacrylamide;
- methacrylamide and derivatives thereof, particularly N-alkylmethacrylamides e.g. N-isopropylmethacrylamide, N-tert-butylmethacrylamide; N,N-dialkylmethacrylamides e.g. N,N-dimethylmethacrylamide and N-methylolmethacrylamide;
- vinylformamide, N-vinylpyridine, N-vinylpyrrolidone, hydroxyalkyl acrylates, hydroxyalkyl methacrylates, acrylates carrying alkoxy chains; methacrylates carrying alkoxy chains.

The preferred non-ionic monomers are acrylamide, methacrylamide, N-vinylpyrrolidone.

As examples of cationic monomers, advantageous use is made of at least one monomer selected from among:
- diallyldialkyl ammonium salts e.g. diallyl dimethyl ammonium chloride (DADMAC);
- dialkylaminoalkyl acrylates, dialkylaminoalkyl methacrylates, in particular dialkylaminoethyl acrylate (DAAEA) and dialkylaminoethyl methacrylate (DAAEMA), and the acidified or quaternized forms thereof e.g. [2-(acryloyloxy)ethyl]trimethyl ammonium chloride;
- dialkyl-aminoalkylacrylamides, dialkyl-methacrylamides, and the acidified or quaternized forms thereof e.g. acrylamido-propyl trimethyl ammonium chloride.

As examples of zwitterionic monomers, advantageous use is made of at least one monomer selected from among:
- sulfobetaine monomers such as sulfopropyl dimethylammonium ethyl methacrylate, sulfopropyl dimethylammonium propylmethacrylamide, sulfopropyl 2-vinylpyridinium;
- phosphobetaine monomers such as phosphato ethyl trimethylammonium ethyl methacrylate, carboxybetaine monomers.

Advantageously according to the invention, the water-swellable polymer (a) may be a copolymer prepared from the monomers previously described or from the monomers previously described and at least one other monomer selected from among:
- hydrophobic monomers e.g. styrene, alkyl-acrylates, alkyl-methacrylates, aryl-acrylates, aryl-methacrylates, hydrophobic derivatives of acrylamide;
- amphiphilic monomers, dodecyl poly(oxyethylene)$_{10}$ methacrylate;

Or from natural polymers such as cellulose derivatives, polysaccharides, clays, for example these natural polymers can be grafted onto the water-swellable polymers of the invention to form another family of water-swellable polymers of the invention.

Preferably, the water-swellable polymer (a) is a copolymer of at least one non-ionic monomer and at least one anionic monomer.

Also preferably, the aqueous dispersion comprises 5 to 60% by weight, preferably 15 to 35% by weight of water-swellable polymer.

For the method of the invention, the particles of water-swellable polymer (a) advantageously have a diameter allowing the dispersion thereof. Preferably the particles have a mean diameter ranging from 0.1 to 1 000 μm, more preferably ranging from 0.1 to 200 μm, further preferably ranging from 0.1 to 20 μm. The mean diameter of the particles can be determined using any method known to persons skilled in the art e.g. via binocular microscopy.

Aside from the water-swellable polymer (a), the aqueous dispersion comprises a compound (b) acting as equilibrating agent. It is a water-soluble or water-miscible compound. In the dispersion of the invention it allows full or partial inhibition of the water-swelling capacity of the polymer (a). Therefore, in this aqueous dispersion in the presence of this compound (b), the water-swellable polymer (a) is in the form of particles and is not or only scarcely in the water-swollen state.

Preferably, the aqueous dispersion comprises at least one compound (b) selected from among mineral or organic salts comprising at least one anion selected from among sulfates, dihydrogen phosphates, phosphates, halides.

Also preferably, the aqueous dispersion comprises at least one compound (b) selected from among mineral or organic salts comprising at least one cation selected from among sodium, potassium, ammonium, magnesium, calcium, aluminium.

The aqueous dispersion may also comprise at least one compound (b) in the form of a mixture of at least two of these mineral or organic salts comprising at least one anion and at least one cation.

Preferably the dispersion, as compound (b), comprises 5 to 45% by weight, preferably 8 to 27% by weight of mineral salt or organic salt.

Compound (b) may also be selected from among dispersant organic polymers such as anionic, non-ionic, cationic or amphoteric polymers and copolymers. Preferably, it is selected from among dispersant organic polymers derived from at least one monomer selected from among monomers comprising at least one double ethylenic bond.

For the preparation of compound (b), the monomers comprising at least one double ethylenic bond can be selected from among anionic monomers. As examples of anionic monomers mention can be made of:
- monomers comprising at least one carboxylic function, in particular acrylic acid, methacrylic acid and the salts thereof;
- monomers comprising at least one sulfonic acid function, in particular 2-acrylamido-2-methylpropane sulfonic acid (AMPS) and the salts thereof.

For the preparation of compound (b), the monomers comprising at least one double ethylenic bond can be selected from among non-ionic monomers. As examples of non-ionic monomers, mention can be made of:

- acrylamide and derivatives thereof such as N-alkylacrylamides, in particular N-isopropylacrylamide, N-tert-butylacrylamide; N,N-dialkylacrylamides, in particular N,N-dimethylacrylamide and N-methylolacrylamide;
- methacrylamide and derivatives thereof such as N-alkylmethacrylamides, in particular N-isopropylmethacrylamide, N-tert-butylmethacrylamide; N,N-dialkylmethacrylamides, in particular N,N-dimethylmethacrylamide and N-methylolmethacrylamide;
- vinylformamide, N-vinylpyridine, N-vinylpyrrolidone, hydroxyalkyl acrylates, hydroxyalkyl methacrylates, acrylates carrying alkoxy chains; methacrylates carrying alkoxy chains.

For the preparation of compound (b), the monomers comprising at least one double ethylenic bond can be selected from among cationic monomers. As examples of cationic monomers, mention can be made of:

- diallyldialkyl ammonium salts, in particular diallyl dimethyl ammonium chloride (DADMAC);
- dialkylaminoalkyl acrylates, dialkylaminoalkyl methacrylates, in particular dialkylaminoethyl acrylate (DAAEA), and dialkylaminoethyl methacrylate (DAAEMA), and the acidified or quaternized forms thereof e.g. [2-(acryloyloxy)ethyl]trimethylammonium chloride,
- dialkyl-aminoalkylacrylamides, dialkyl-methacrylamides, and the acidified or quaternized forms thereof e.g. acrylamido-propyl trimethyl ammonium chloride.

For the preparation of compound (b), the monomers comprising at least one double ethylenic bond can be selected from among zwitterionic monomers. As examples of zwitterionic monomers mention can be made of:

- sulfobetaine monomers such as sulfopropyl dimethylammonium ethyl methacrylate, sulfopropyl dimethylammonium propylmethacrylamide, sulfopropyl 2-vinylpyridinium;
- phosphobetaine monomers such as phosphato ethyl trimethylammonium ethyl methacrylate, carboxybetaine monomers Preferably, the aqueous dispersion comprises at least one compound (b) selected from among polymers or copolymers based on acrylic acid, 2-acrylamido-2-methylpropane sulfonic acid and the salts thereof, and acrylamide.

The particularly preferred dispersant polymers are amphoteric anionic polymers obtained from 2-acrylamido-2-methyl-1-propane sulfonic acid (AMPS) or the salts thereof, or from acrylic acid or the salts thereof, of from methacrylic acid or the salts thereof, and the copolymers obtained from these monomers.

Also preferably, the aqueous dispersion comprises at least one compound (b) selected from among dispersant organic polymers having a molecular weight ranging from 500 to 100 000 g·mol$^{-1}$, preferably ranging from 1 000 to 50 000 g·mol$^{-1}$; more preferably ranging from 1 000 to 30 000 g·mol$^{-1}$.

Preferably the dispersion, as compound (b), comprises less than 30% by weight, preferably from 5 to 20% by weight of dispersant organic polymer.

According to the invention, the dispersion may also comprise at least one additive selected from among polyfunctional alcohols e.g. glycerol, polyethylene glycol and polypropylene glycol; polyalkylene ethers. Advantageously, the additive is contained in an amount by weight of dispersion ranging from 0.001 to 20% by weight, preferably 0.5 to 10%.

The method of the invention comprises the application of the aqueous dispersion to all or part of the surface of the plant material. This application can be performed using different techniques. Application can particularly be carried out by coating, dipping, spraying or daubing the plant material.

When used according to the method of the invention, the aqueous dispersion may also comprise at least one substance of agronomic interest or at least one substance allowing improved development or growth of the plant material. Preferably, this substance is selected from among fertilizers, hormones, micro-organisms, mycorrhizas, growth stimulators, growth regulators, phytosanitary products, e.g. fungicides, insecticides, safeners.

Said additional substance may therefore be contained in the aqueous dispersion. It may also be applied separately. Therefore, the method of the invention may also comprise the application of at least one substance of agronomic interest or at least one substance allowing improved development or growth of the plant material. Preferably, this substance is selected from among fertilizers, hormones, micro-organisms, mycorrhizas, growth stimulators, growth regulators, phytosanitary products, e.g. fungicides, insecticides, safeners, before, simultaneously with or after application of the dispersion to the plant material.

In addition to the application of the aqueous dispersion, the method of the invention may also comprise the application to the plant material of a binding agent before or simultaneously with application of the aqueous dispersion of the invention to the plant material. Preferably, this binding agent is selected from among polyvinyl alcohols (PVOH), polyvinyl acetates (PVAc), polyacrylamides, polyacrylates, polymethacrylates, acrylamide/acrylate copolymers, acrylamide/methacrylate copolymers, polyvinylpyrrolidones (PVP), vinylpyrrolidone/dimethylaminoethylmethacrylate copolymers, vinylpyrrolidone/styrene copolymers, vinylpyrrolidone/vinylacetate copolymers, cellulose derivatives, natural gums, clays, graphite, talc, silica.

The method of the invention may also comprise the application to the plant material of a film-forming of film-coating agent, simultaneously with or after application of the dispersion to the plant material. Preferably, this film-forming or film-coating agent is selected from among polyvinyl pyrrolidones (PVP), vinylpyrrolidone/styrene copolymers, vinylpyrrolidone/vinylacetate copolymers, vinylpyrrolidone/dimethylaminoethylmethacrylate copolymers, polyacrylamides, acrylamide/acrylate copolymers, acrylamide/methacrylate copolymers, methylvinylether/maleic anhydride copolymers, polyurethanes, polyvinyl alcohols, polyvinyl acetates, cellulose derivatives, alginates, natural gums.

Advantageously, the method of the invention may also comprise prior preparation of the aqueous dispersion comprising:
  (a) particles of at least one water-swellable polymer;
  (b) at least one compound selected from among a mineral salt, organic salt, dispersant organic polymer and mixtures thereof,
via polymerisation of the water-swellable polymer directly in an aqueous solution comprising at least one compound selected from among a mineral salt, organic salt, dispersant organic polymer and mixtures thereof (this technique being called aqueous dispersion polymerisation); or via simple mixing of compounds a) and b); preferably via aqueous dispersion polymerisation. Aqueous dispersion polymerisation is performed following techniques known to persons skilled in the art.

Also advantageously, the method of the invention may also comprise drying of the plant material after application of the dispersion.

The method concerns a method to treat plant material by means of an aqueous dispersion. It also concerns the plant material resulting from this method of the invention. Therefore, the invention concerns plant material having a surface that is fully or partly coated with an aqueous suspension comprising:
  (a) particles of at least one water-swellable polymer;
  (b) at least one compound selected from among a mineral salt, organic salt, dispersant organic polymer and mixtures thereof.

The particular, advantageous or preferred characteristics of the method of the invention define a particular, advantageous or preferred plant material.

The invention also concerns the use of the plant material prepared according to the invention to cultivate or produce a plant derived from this plant material. The particular, advantageous or preferred characteristics of the method of the invention define a particular, advantageous or preferred use.

The different aspects of the invention are illustrated by the following examples.

EXAMPLES

Table of the compositions used in the different examples

| Composition | Description |
| --- | --- |
| A (comparative) | Mixture containing 33 weight % of water-swellable polymer in the form of a cross-linked acrylamide and sodium acrylate powder, of particle size less than 200 μm, and 67 weight % of fine graphite powder. The micronized graphite is a non-aqueous binding agent. |
| B (of the invention) | Aqueous dispersion containing 25 weight % of water-swellable polymer of cross-linked acrylamide and sodium acrylate, of particle size less than 15 μm. This aqueous dispersion contains a total of 43 weight % dry matter including the water-swellable polymer, ammonium sulfate and dispersant polymers. |
| C (comparative) | Mixture containing 99.35 weight % water and 0.65 weight % of water-swellable polymer in the form of a copolymer powder of cross-linked acrylamide and sodium acrylate, previously screened to 200 μm in the dry state (its weight absorption capacity is 150 times in this water). In this composition the water-swellable polymer is fully hydrated in slight excess water. |
| D (comparative) | Composition containing the same ingredients as composition C but here the water-swellable polymer is only partly hydrated. The composition contains 99% water and 1% water-swellable polymer (by weight). |
| E (comparative) | Water-swellable polymer of cross-linked acrylamide and sodium acrylate in the form of an inverse water-in-oil emulsion. The emulsion contains 30% water-swellable polymer. |

Example 1

Case 1) 0.5 g of composition A was applied to 50 g of common wheat seeds, in a weight ratio of 1:100. To prevent hazardous exposure to dust, application was performed under a suction hood, in a stainless-steel rotating drum of diameter 20 cm, and the end product (seeds coated with composition A) was subjected to a drying step 5 minutes at 40° C.

Case 2) 11.6 g of composition B were applied to 50 g of common wheat seeds, the composition dry matter/seed ratio being 1:10. The application method was the same as described for Case 1.

In each case, to evaluate the quality of adhesion of the compositions to the seeds, the whole mixture obtained was placed on a sieve of mesh size 300 μm, subjected to vibration of amplitude 1.5 mm/"g" (1 g=9.81 m/s$^2$) for 1 minute (Retsch AS 200 Control Sieve Shaker), to generate attrition and abrasion. The percentage of free fine particles was inferred from the quantity passing through the 300 μm sieve relative to the weight of water-swellable polymer initially applied (dry matter)

Results:

|  | Weight of applied water-swellable polymer (g) | Percent free fines (%) |
| --- | --- | --- |
| Case 1 | 0.165 | 75 |
| Case 2 | 2.9 | 0.8 |

According to the method of the invention (Case 2) it is possible, in more reliable manner, to apply larger quantities of water-swellable polymer whilst obtaining better properties of coating adhesion to the seeds than the method in Case 1.

Example 2

Case 1) 50 g of composition C were applied to 50 g of common wheat seeds in a stainless-steel rotating drum of diameter 20 cm. The system required a minimum drying time of 25 min at 40° C. to obtain a dry coating. On completion of the method, under visual observation, the rate of coating of the surface of seeds with the coating product was estimated to be less than 5%.

Case 2) 50 g of composition D were applied to 50 g of common wheat seeds in a stainless-steel rotating drum of diameter 20 cm. The system required a minimum drying time of 20 min at 40° C. to obtain a dry coating. On completion of the method under visual observation, the rate of coating of the surface of the seeds with the coating product was estimated to be less than 10%.

Case 3) 50 g of seeds were treated with composition B in identical manner to Example 1, Case 2, i.e. 11.6 g of composition B. On completion of the method, under visual observation, the rate of coating of the seeds with the coating product was estimated to be higher than 90%.

In comparison, the coating methods of Cases 1) and 2) are much more restrictive for persons skilled in the art since they require the handling of large volumes of compositions C and D and involve a particularly lengthy drying step to remove the large amount of water used. In addition, the final quantity of applied polymer is low compared with the product obtained in Case 3) representing the method of the invention.

Example 3

Case 1) 50 g of common wheat seeds were treated with 1 weight % of composition E. Application was carried out in a stainless-steel rotating drum of diameter 20 cm. The product was subjected to a drying step of 10 min/40° C.

Case 2) 50 g of common wheat seeds were treated with 1 weight % of composition B, following the same steps as described for Case 1.

Case 3) 50 g of common wheat seeds were treated with 6 weight % of composition E following the same steps as described for Case 1.

Case 4) 50 g of common wheat seeds were treated with 6 weight % of composition B following the same steps as described for Case 1.

The flowability of the treated seeds was tested using a cone having an orifice of diameter smaller than 1.5 cm. The seeds were first loaded into the cone. The lower orifice was initially closed at the time of loading then opened at time $t_0$ to evaluate the capacity of the seeds to flow through the orifice. The test was considered to be successful if the entirety of the load flowed through the orifice after $t_0+30$ seconds.

Results:

|  | Test success rate* |
|---|---|
| Case 1 | 65% |
| Case 2 | 90% |
| Case 3 | 0% |
| Case 4 | 35% |

*For each case, a mean of 20 tests was calculated,

For equivalent dosages of coating composition, the flowability of the seeds treated according to the method of the invention (Cases 2 and 4) was significantly better than for Cases 1 and 3, this being a definite advantage for persons skilled in the art.

The invention claimed is:

1. A method for treating a plant material comprising applying an aqueous dispersion to all or part of the surface of the plant material, wherein the aqueous dispersion comprises:
   (a) particles of at least one water-swellable polymer that maintains a water absorption capacity greater than 10 times its volume; and
   (b) at least one equilibrating agent selected from the group consisting of a mineral salt, an organic salt, a dispersant organic polymer, and mixtures thereof; and
   wherein the water-swellable polymer is applied to the plant material in non-hydrated form.

2. The method according to claim 1, wherein the plant material is propagation plant material or reproduction plant material.

3. The method according to claim 1, wherein the water-swellable polymer is derived from at least one water-soluble monomer comprising at least one double ethylenic bond.

4. The method according to claim 1, wherein the particles of the aqueous dispersion have a mean diameter ranging from 0.1 to 1 000 μm.

5. The method according to claim 1, wherein the aqueous dispersion comprises 5 to 60% by weight of water-swellable polymer.

6. The method according to claim 1, wherein the aqueous dispersion comprises at least one equilibrating agent (b) selected from the group consisting of:
   mineral or organic salts comprising at least one anion selected from the group consisting of sulfates, dihydrogen phosphates, phosphates, and halides;
   mineral or organic salts comprising at least one cation selected from the group consisting of sodium, potassium, ammonium, magnesium, calcium, and aluminium;
   mixtures of at least two of these salts;
   dispersant organic polymers having a molecular weight ranging from 500 to 100 000 $g \cdot mol^{-1}$;
   dispersant organic polymers selected from the group consisting of anionic, cationic, and amphoteric polymers and copolymers; and
   polymers or copolymers based on acrylic acid, 2-acrylamido-2-methylpropane sulfonic acid and the salts thereof, or acrylamide.

7. The method according to claim 1, wherein the aqueous dispersion comprises:
   5 to 45% by weight of mineral salt or organic salt; or
   less than 30% by weight of dispersant organic polymer.

8. The method according to claim 1, wherein application of the aqueous dispersion to the plant material is obtained by coating, dipping, spraying or daubing.

9. The method according to claim 1, wherein the aqueous dispersion further comprises at least one substance of agronomic interest or at least one substance allowing improved development or growth of the plant material.

10. The method according to claim 1 further comprising:
   application of a binding agent selected from the group consisting of polyvinyl alcohols (PVOH), polyvinyl acetates (PVAc), polyacrylamides, polyacrylates, polymethacrylates, acrylamide/acrylate copolymers, acrylamide/methacrylate copolymers, polyvinylpyrrolidones (PVP), vinylpyrrolidone/dimethylaminoethylmethacrylate copolymers, vinylpyrrolidone/styrene copolymers, vinylpyrrolidone/vinylacetate copolymers, cellulose derivatives, natural gums, clays, graphite, talc, and la silica, before or simultaneously with application of the dispersion to the plant material;
   application of a film-forming or film-coating agent, selected from the group consisting of polyvinylpyrrolidones (PVP), vinylpyrrolidone/styrene copolymers, vinylpyrrolidone/vinylacetate copolymers, vinylpyrrolidone/dimethylaminoethylmethacrylate copolymers, polyacrylamides, acrylamide/acrylate copolymers, acrylamide/methacrylate copolymers, methylvinylether/maleic anhydride copolymers, polyurethanes, polyvinyl alcohols, polyvinyl acetates, cellulose derivatives, alginates, and natural gums, simultaneously with or after application of the dispersion to the plant material; or
   application of at least one substance of agronomic interest or at least one substance allowing improved development or growth of the plant material selected from the group consisting of fertilizers, hormones, micro-organisms, mycorrhizas, growth stimulators, growth regulators, phytosanitary products, fungicides, insecticides, and safeners before, simultaneously with, or after application of the dispersion to the plant material.

11. The method according to claim 1, wherein said method further comprises:
   prior preparation of the aqueous dispersion comprising:
      (a) particles of at least one water-swellable polymer that maintains a water absorption capacity greater than 10 times its volume;
      (b) at least one equilibrating agent selected from the group consisting of a mineral salt, organic salt, dispersant organic polymer and mixtures thereof;
   by polymerization of the water-swellable polymer directly in an aqueous solution comprising at least one equilibrating agent selected from the group consisting of a mineral salt, organic salt, dispersant organic polymer, and mixtures thereof; or via simple mixing of compounds a) and b); and
   drying the plant material after application of the dispersion.

12. A method of using the plant material prepared according to the method of claim 1 comprising cultivating or producing a plant derived from said plant material.

\* \* \* \* \*